United States Patent
Thommana et al.

(10) Patent No.: US 10,951,306 B1
(45) Date of Patent: Mar. 16, 2021

(54) SYSTEM FOR DATA LINK NETWORKING BASED ON MACHINE LEARNING

(71) Applicant: Rockwell Collins, Inc., Cedar Rapids, IA (US)

(72) Inventors: John Thommana, Cedar Rapids, IA (US); Syed Asim Ahmed, Iowa City, IA (US); Lizy Paul, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/393,746

(22) Filed: Apr. 24, 2019

(51) Int. Cl.
| | |
|---|---|
| *H04B 7/26* | (2006.01) |
| *G06N 20/00* | (2019.01) |
| *H04W 84/00* | (2009.01) |
| *H04W 24/02* | (2009.01) |
| *H04B 17/373* | (2015.01) |

(52) U.S. Cl.
CPC .......... *H04B 7/2609* (2013.01); *G06N 20/00* (2019.01); *H04B 17/373* (2015.01)

(58) Field of Classification Search
CPC ... H04W 84/005; H04W 24/02; H04W 24/04; H04W 28/0268; H04W 4/40; H04W 84/06; G01S 13/86; G01S 2013/9316
See application file for complete search history.

(56) References Cited

U.S. PATENT DOCUMENTS

2016/0381596 A1* 12/2016 Hu .................. H04B 7/18504
370/236

* cited by examiner

Primary Examiner — Philip Sobutka
(74) Attorney, Agent, or Firm — Suiter Swantz pc llo (57) ABSTRACT

A communication system including a transmit antenna that transmits an output signal including output information, a network interface that receives state data regarding a first remote platform, and a processing circuit. The processing circuit predicts a performance of a communication link that the transmit antenna uses to transmit the output signal based on the state data, evaluates a performance condition based on the estimated performance and a threshold performance, responsive to the performance condition being satisfied, uses the transmit antenna to transmit the output signal, and responsive to the performance condition not being satisfied, at least one of (i) adjusts at least one of a time parameter or a frequency parameter that the transmit antenna uses to transmit the output signal, or (ii) provide an instruction to a second remote platform to cause the second remote platform to transmit the output information to the first remote platform.

20 Claims, 5 Drawing Sheets

SYSTEM FOR DATA LINK NETWORKING BASED ON MACHINE LEARNING

BACKGROUND

The present disclosure relates generally to the field of network communications. More particularly, embodiments of the inventive concepts disclosed herein relate to systems and methods of data link networking performance improvement using machine learning.

Antennas, such as directional antennas, can be used for point-to-point communications. For example, aircraft and other platforms or entities can use the common data link (CDL) protocol for point-to-point communications. However, as entities move in space, connectivity may be lost between entities.

SUMMARY

In one aspect, the inventive concepts disclosed herein are directed to a communication system including a transmit antenna, a network interface, and a processing circuit. The transmit antenna transmits an output signal including output information. The network interface receives state data regarding a first remote platform. The processing circuit is configured to predict a performance of a communication link that the transmit antenna uses to transmit the output signal to a receive antenna of the first remote platform based on the state data, evaluate a performance condition based on the estimated performance and a threshold performance, responsive to the performance condition being satisfied, use the transmit antenna to transmit the output signal to the first remote platform, and responsive to the performance condition not being satisfied, at least one of (i) adjust at least one of a time parameter or a frequency parameter that the transmit antenna uses to transmit the output signal to the receive antenna, or (ii) provide an instruction to a second remote platform to cause the second remote platform to transmit the output information to the first remote platform.

In a further aspect, the inventive concepts disclosed herein are directed to a method. The method includes receiving, at a network interface, state data regarding a first remote platform, executing, by a processing circuit, a communication performance function using the state data to estimate a performance of a communication link that a transmit antenna uses to transmit an output signal to a receive antenna of the first remote platform, evaluating, by the processing circuit, a performance condition based on the estimated performance and a threshold performance, responsive to the performance condition being satisfied, the transmit antenna to transmit the output signal to the first remote platform, and responsive to the performance condition not being satisfied, at least one of (i) adjusting, by the processing circuit, at least one of a time parameter or a frequency parameter that the transmit antenna uses to transmit the output signal to the receive antenna, or (ii) providing, by the processing circuit, an instruction to a second remote platform to cause the second remote platform to transmit the output information to the first remote platform.

In a further aspect, the inventive concepts disclosed herein are directed to a method. The method includes receiving, by a machine learning circuit, a plurality of performance data points regarding performance of a communication link between a first platform and a second platform during a maneuver performed by the first platform, receiving, by the machine learning circuit, a plurality of state data points regarding at least one of the first platform or the second platform during the maneuver performed by the first platform, the plurality of state data points including trajectory data, assigning, by the machine learning circuit, each performance data point of the plurality of performance data points to a corresponding state data point of the plurality of state data points, providing, by the machine learning circuit, the plurality of state data points as an input to a candidate performance function, the candidate performance function including at least one parameter that operates on the input to generate a candidate output, executing, by the machine learning circuit, the candidate performance function to generate the candidate output, and adjusting, by the machine learning circuit, the at least one parameter based on the plurality of performance data points and the candidate output to output an adjusted performance function.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b ). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods of networking performance improvement using machine learning, including performance improvement of common data link (CDL) networks. In some embodiments, a communication system includes a transmit antenna that transmits an output signal including output information. The system includes a network interface that receives state data regarding a first remote platform. The system includes a processing circuit configured to predict a performance of a communication link that the transmit antenna uses to transmit the output signal to the first remote platform based on the state data, evaluate a performance condition based on the estimated performance and a threshold performance, responsive to the performance condition being satisfied, use the transmit antenna to transmit the output signal to the first remote platform, and responsive to the performance condition not being satisfied, at least one of (i) adjust at least one of a time parameter or a frequency parameter that the transmit antenna uses to transmit the output signal to the receive antenna, or (ii) provide an instruction to a second remote platform to cause the second remote platform to transmit the output information to the first remote platform.

Systems and methods in accordance with the inventive concepts disclosed herein can improve communication networks by controlling communications devices in a manner that rapidly establishes communication links, and increases the likelihood that the communications devices maintain the communications links once established—even as the platforms or other entities implementing the communications devices move in space. For example, CDL links can use directional antennas that have beam widths of approximately 10 degrees to 25 degrees. However, it can be challenging to keep the directional antennas pointed in appropriated directions and to keep the CDL link synchronized, including in airborne environments. Antenna pointing solutions may communicate antenna location, orientation, and heading in-band (e.g., over the synchronized CDL link) or out of band (e.g., using a waveform other than the CDL link). For example, in some cases, airborne CDL nodes fly in patterns (e.g., circular, figure eight) to distribute data such as intelligence, surveillance, and reconnaissance (ISR) data in a region. However, if each CDL node is intended to communicate with multiple other mobile or stationary nodes using directional CDL and/or free space optical communication links, there may be a high probability that some of the links are broken due to antenna orientation, aircraft body shadowing, and potentially terrain interference. In various use cases of point-to-point communication links, including those discussed above, using a communication protocol such as time domain multiple access (TDMA), which allocates segments of time for communication between nodes, may not be an effective solution because the allocated segment of time may correspond to a point in time at which communication between the nodes is not possible (or may have a high likelihood of failure).

Systems and methods in accordance with the inventive concepts disclosed herein can monitor node and antenna orientation in space, in order to determine which links (e.g., communication links between particular nodes) are available over particular antennas, and select nodes and antennas for communication that are expected to perform well, such as by not being shadowed or not interfered with, and/or having a low error rate, such as bit error rate, frame error rate, or packet error rate. For example, systems and methods in accordance with the present solution can use out-of-band control and communication mesh network(s) to keep track of CDL nodes and their antenna orientation in space, and use the information transferred through the mesh network(s) to more effectively decide which antennas and links to communicate between nodes to reduce the likelihood of data being transmitted over links that are disconnected, shadowed, or have high error rates. Systems and methods in accordance with the inventive concepts disclosed herein can be waveform and radio agnostic, monitor the status of multiple traffic networks for battlespace awareness, dynamically manage spectrum and/or radio/RF resources, dynamically set up and tear down traffic links to maintain desired connectivity, support real-time quality of service (QoS), policy, and security aware routing, and be agnostic of the network management tool used to configure the battle space. In some embodiments, a machine learning solution is used to train communications devices to more effectively determine when and how to transmit data over particular links based on data regarding aircraft flight patterns and associated link connectivity.

The inventive concepts disclosed herein can be utilized in a number of communication systems, including radio hardware on airborne platforms. The inventive concepts disclosed herein can be used to enable improved communications amongst various types of electronic avionics applications for ground-based platforms and airborne platforms (e.g., aircraft), including but not limited to flight control and autopilot systems, navigation systems, flight display systems, communications systems, radar systems, electric power systems, engine control systems, and monitor warning systems.

Figure 1:
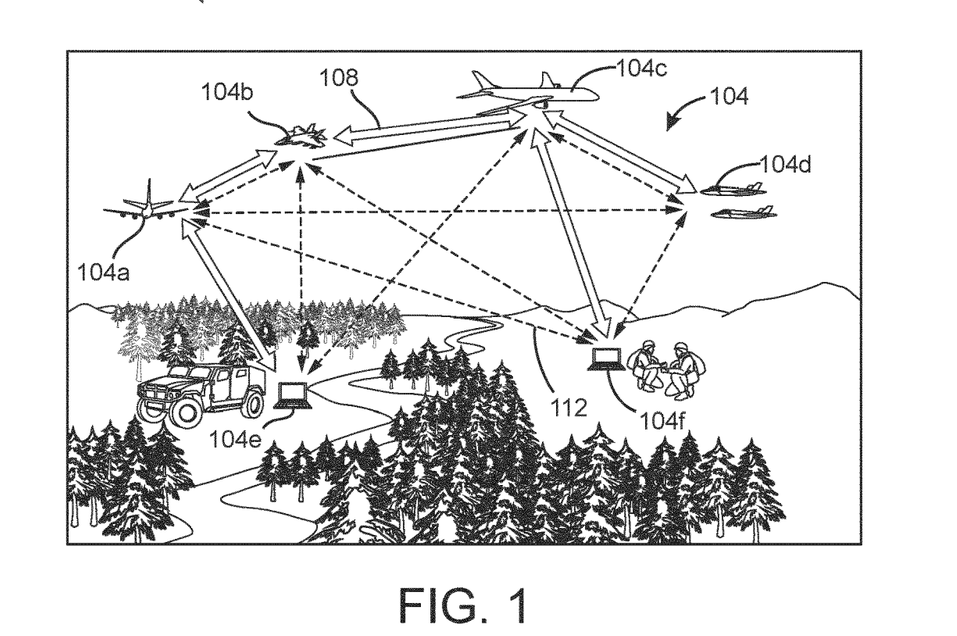
FIG. 1 is a schematic diagram of an exemplary embodiment of a communication data link environment according to the inventive concepts disclosed herein.

Referring now to FIG. 1, an embodiment of a network 100 according to the inventive concepts disclosed herein includes a plurality of nodes 104. The plurality of nodes 104 can be implemented by various entities, such as airborne platforms 104a, 104b, 104c, and 104d, ground-based platform 104e, and personnel 104f. For example, each node 104 can be implemented by at least one communications system associated with the corresponding entity. The at least one communications system can include an antenna, such as a directional antenna, that can be used to transmit data to other nodes 104, such as through a CDL. The at least one communications system can communicate antenna location, orientation, and heading information in-band or out-of-band (e.g., using a network interface separate from the antenna).

The plurality of nodes 104 can communicate various information using various communications links and networking protocols. For example, the plurality of nodes 104 can establish communications links 108 (e.g., CDL), and mesh control links 112. The plurality of nodes 104 can communicate navigation data, such as antenna position (e.g., azimuth, elevation), node 104 position (e.g., latitude, longitude, altitude), attitude (e.g., heading, pitch, roll), velocity (e.g., direction and speed; east, west, north, south, down, and up velocity), next waypoint (e.g., latitude, longitude, altitude, time).

Figure 2:
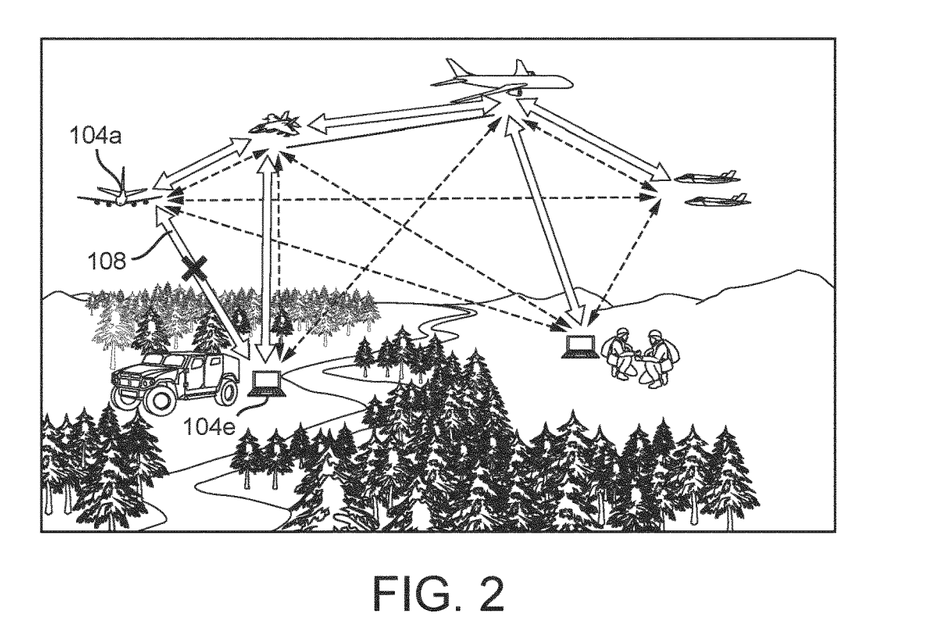
FIG. 2 is a schematic diagram of an exemplary embodiment of the communication data link environment of FIG. 1 in which a communication data link is broken, according to the inventive concepts disclosed herein.

Based on this information, each node 104 of the plurality of nodes 104 can maintain information regarding the position and orientation of each node 104 as well as the position and orientation of each other node 104. However, due to various factors, such as movement of the nodes 104, interference, or other obstructions, there may be short term breakages of the communications links 108 between the plurality of nodes 104. For example, as shown in FIG. 2, a link 108 between nodes 104a and 104e can break, disrupting communication between the nodes 104a and 104e.

Figure 3:
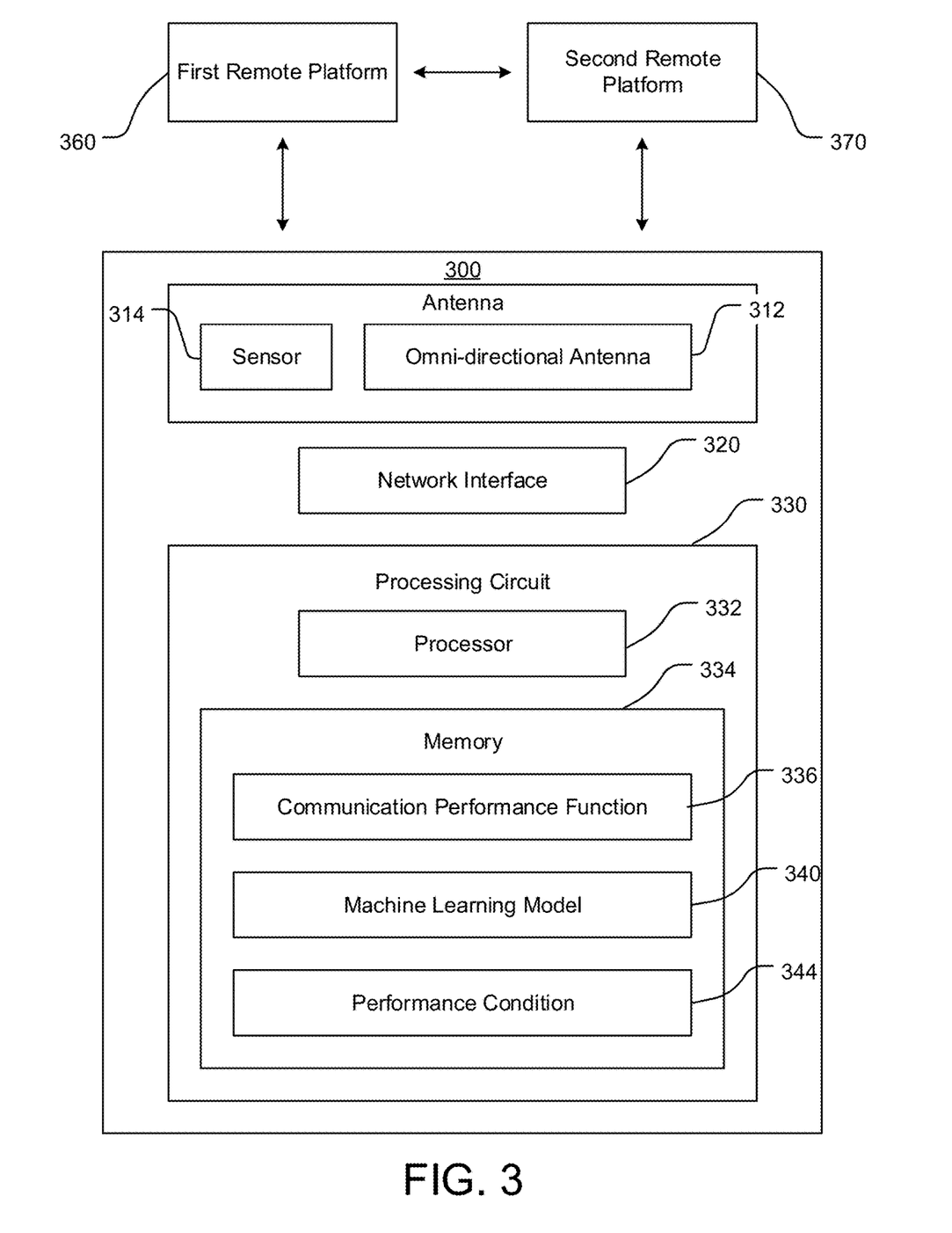
FIG. 3 is a block diagram of an exemplary embodiment of a communication system according to the inventive concepts disclosed herein.

Referring now to FIG. 3, an embodiment of a communication system 300 according to the inventive concepts disclosed herein includes at least one antenna 310, a network interface 320, and a processing circuit 330. The at least one antenna 310 can include an antenna that is mechanically or electronically steerable, such as a mechanically or electronically steerable antenna having a single beam, in which case the at least one antenna 310 can include an omni-directional antenna 312 coupled to the network interface 320 to communicate navigation data with other entities (e.g., the communication system 300 can communicate with other nodes 104 of the plurality of nodes 104). For example, when the communication link is not established, the omni-directional antenna 312 can detect an orientation of the remote node 104 (e.g., antenna(s) thereof) and provide the orientation of the remote node 104 to other components of the communication system 300. The antenna 310 can be pointed towards the remote node 104 based on the orientation detected by the omni-directional antenna 312 (e.g., responsive to a control signal received from the processing circuit 330 based on the orientation of the remote node 104). While the directional communication link is established, the at least one antenna 310 as well as the antenna(s) of the remote node 104 can periodically exchange information, such as antenna orientation information, to one another, as well as via the omni-directional antenna 312. As such, various radios in the vicinity can use the information exchanged via the omni-directional antenna 312 to detect the positions and orientations of each node 104 and the antenna(s) thereof, facilitating link establishment.

The antenna 310 can have a beam width, which may be on the order of 10 degrees to 25 degrees. The antenna 310 can transmit an output signal, such as to transmit output information. The output information can include various information to be transmitted amongst the nodes 104, such as mission data, position data, or orientation data.

The antenna 310 can be a multi-beam antenna, such as an electronically steerable antenna, such as an active electronically steerable antenna (AESA). The multi-beam antenna 310 can use at least a subset of the beams to establish communication links with other entities. In various such cases, the antenna 310 may or may not include the omni-directional antenna 312; there may be a time required for the antenna 310 to search a volume of space (e.g., search through azimuth and elevation) to find the remote entity with which to establish the communication link, which can be reduced by using the omni-directional antenna 312 to facilitate the search process.

The antenna 310 can include or be coupled with a sensor 314 that detects an orientation of the antenna 310. For example, the sensor 314 can include at least one of an accelerometer, a magnetometer, or a gyroscope that detects and outputs the orientation of the antenna 310. The sensor 314 can provide the orientation of the antenna 310 to the plurality of nodes 104, such as by using at least one of the antenna 310 or the network interface 320 to output the orientation of the antenna 310.

The network interface 320 can receive state data regarding a first remote platform 360 (e.g., another node 104 of the plurality of nodes 104). The network interface 320 can receive the state data via the omni-directional antenna 312 or another beam of the AESA antenna 310 as appropriate. The state data can include navigation data, such as a position of an antenna of the first remote platform 360 (e.g., azimuth, elevation), a position of the first remote platform 360 (e.g., latitude, longitude, altitude), an attitude of the first remote platform 360 (e.g., heading, pitch, roll), a velocity of the first remote platform 360 (e.g., direction and speed; east, west, north, south, down, and up velocity), or a next waypoint of the first remote platform 360 (e.g., latitude, longitude, altitude, time).

The processing circuit 330 includes a processor 332 and memory 334. The processor 332 may be implemented as a specific purpose processor, an application specific integrated circuit (ASIC), one or more field programmable gate arrays (FPGAs), a group of processing components, or other suitable electronic processing components. The memory 334 is one or more devices (e.g., RAM, ROM, flash memory, hard disk storage) for storing data and computer code for completing and facilitating the various user or client processes, layers, and modules described in the present disclosure. The memory 334 may be or include volatile memory or non-volatile memory and may include database components, object code components, script components, or any other type of information structure for supporting the various activities and information structures of the inventive concepts disclosed herein. The memory 334 is communicably connected to the processor 332 and includes computer code or instruction modules for executing one or more processes described herein. The memory 334 includes various circuits, software engines, and/or modules that cause the processor 332 to execute the systems and methods described herein.

The processing circuit 300 can control a direction of the antenna 310 to cause the antenna 310 to transmit the output signal along the direction to the first remote platform 360 (as well as one or more second remote platforms 370). The processing circuit 300 can determine the direction based on at least one of an expected position or an expected orientation of an antenna of the first remote platform 360 to which antenna 310 transmit the output signal.

The processing circuit 330 can execute a communication performance function 336 maintained by the memory 334. The communication performance function 336 can estimate a performance (e.g., estimated performance, expected performance) of a communication link that the antenna 310 uses to transmit the output signal to the first remote platform 360. The processing circuit 330 can estimate the performance to correspond to a likelihood that the communication link can be maintained during at least a portion of a maneuver performed by at least one of a platform that implements the communication system 300 or the first remote platform 360. For example, the performance can correspond to a likelihood that the communication system 300 can continue to successfully transmit the output signal to the first remote platform 360 while the first remote platform 360 is performing a circular or figure eight pattern. The likelihood can correspond to an expectation that a link outage will occur. The processing circuit 330 can estimate the performance for a predetermined period of time or a period of time associated with the output signal, such as a period of time expected for transmission of the output signal to the first remote platform 360.

In some embodiments, the processing circuit 300 determines the estimated performance by determining an error of transmitting the output signal to the first remote platform 360. The error can include one or more of various metrics, such as bit error rate, frame error rate, or packet error rate. The bit error rate can be a number of bit errors (e.g., bits of data having errors, such as incorrect values) per a unit of time. The frame error rate can be a number of frame errors (e.g., frames of data having errors, such as incorrect values) per a unit of time. For example, the frame error rate can be a rate of errors of Ethernet frames of the output signal per a unit of time. The packet error rate can be a number of packet errors (e.g., packets of data having errors, such as incorrect values) per a unit of time. The processing circuit 300 can determine the estimated performance by estimating a signal power or strength of the output signal.

The processing circuit 300 can execute the performance function 336 based on the state data received from the first remote platform 360. For example, the processing circuit 300 can use the orientation of an antenna of the first remote platform 360 to determine whether the communication link with the antenna may be expected to break while the output signal is being transmitted to the first remote platform 360. The processing circuit 360 can use the velocity data of the state data to estimate a future position of the first remote platform 360 and determine how the change in position of the first remote platform 360 may affect the communication link.

The processing circuit 300 can execute the performance function 336 using a machine learning model 340. As discussed below with respect to FIG. 4, the machine learning model 340 can be trained to receive inputs regarding at least one of the communication system 300 or the first remote platform 360, and output the estimated performance. For example, the machine learning model 340 can include a regression function trained using flight data, such as platform and antenna position and orientation data, in order to generate the estimated performance.

The processing circuit 300 can execute a plurality of machine learning models 340 (e.g., instantiations of the machine learning model 340) for each potential communication link between the communication system 300 and the first remote platform 360. For example, if the antenna 310 includes a first antenna 310 and a second antenna 310, and the first remote platform 360 includes a third antenna 364 and a fourth antenna 364, the processing circuit 300 can execute four machine learning models 340 corresponding to each pair of antennas amongst the first antenna 310, second antenna 310, third antenna 364, and fourth antenna 364. As such, the processing circuit 300 can determine linking behaviors, such as that in a particular orientation, only certain links can be established, as certain antennas may be shadowed by body or wing portions of the respective platforms.

The processing circuit 300 can evaluate a performance condition 344 based on the estimated performance and a threshold performance of the performance condition 344. For example, the performance condition 344 can indicate a threshold error (e.g., error rate) that should not be exceeded for transmission of the output signal. The threshold performance can correspond to the parameter represented by the estimated performance; for example, if the estimated performance includes an estimated bit error rate, the performance condition 344 can be evaluated using a threshold bit error rate. The processing circuit 300 can determine the performance condition 344 to be satisfied responsive to the estimated performance meeting or exceeding the threshold performance if the threshold performance is a minimum threshold. The processing circuit 300 can determine the performance condition to be satisfied responsive to the estimated performance being less than or equal to the threshold performance if the threshold performance is a maximum threshold.

Figure 6:
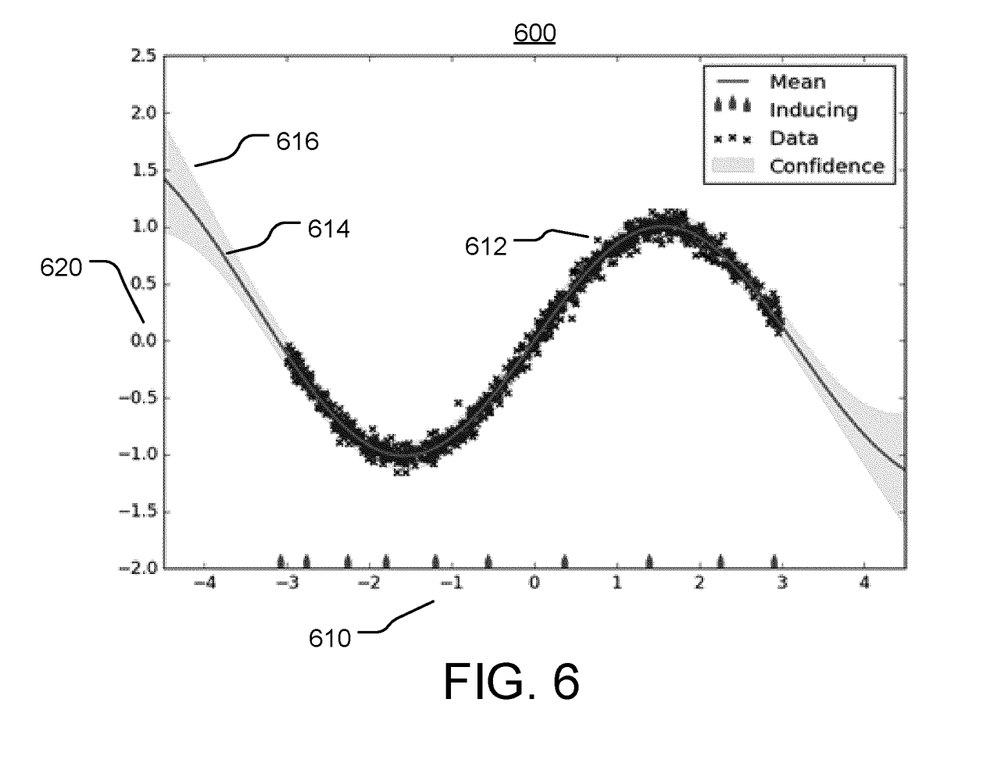
FIG. 6 is a chart representing an exemplary embodiment of operation of the machine learning model of FIG. 4.

In some embodiments, the processing circuit 330 evaluates the performance condition 344 based on a confidence level associated with the expected performance generated by the machine learning model 340, such as by assigning a weight to the expected performance based on the confidence level. For example, if the expected performance has relatively low confidence (e.g., relatively larger confidence bars 616 indicating a range of values for which the confidence in the value meets a confidence threshold, such as 95 percent confidence, is relatively large), the processing circuit 330 can assigning a relatively lower weight to the expected performance, making it more likely that the processing circuit 330 determines to use a different communication link or node to cause the output information to be transmitted to the first remote platform 360.

The processing circuit 300 can use the evaluation of the performance condition 344 to determine whether to transmit the output signal to the first remote platform 360, adjust how the transmit antenna 310 transmits the output signal, and/or cause a second remote platform 370 to transmit the output signal to the first remote platform 360. For example, if the processing circuit 300 determines that the estimated performance satisfies the performance condition 344, the processing circuit 300 can transmit the output signal to the first remote platform 360. If the processing circuit 300 determines that the estimated performance does not satisfy the performance condition 344, the processing circuit 300 can adjust at least one of a time parameter or a frequency parameter that the transmit antenna 310 uses to transmit the output antenna to the first remote platform 360 and/or request the second remote platform 370 to transmit the output signal to the first remote platform 370.

In some embodiments, the performance condition 344 can include a plurality of threshold performances, which may have different values. The processing circuit 300 can compare the estimated performance to each of the plurality of threshold performances, and determine if and how to transmit the output signal to the first remote platform 360 based on the results of each comparison. For example, if the estimated performance satisfies a first threshold performance (e.g., the estimated performance is less than a relatively high error rate threshold) but not a second threshold performance (e.g., the estimated performance is greater than a relatively low error rate threshold), the processing circuit 300 can determine to adjust the at least one of the time parameter or the frequency parameter. Responsive to adjusting the at least one of the time parameter or the frequency parameter, the processing circuit 300 can execute the performance function 336 using the adjusted at least one of the time parameter or the frequency parameter to determine an adjusted estimated performance, and evaluate the performance condition 344 using the adjusted estimated performance. If the estimated performance does not satisfy one or more of the plurality of threshold performances, the processing circuit 300 can determine to transmit a request to the second remote platform 370 to cause the second remote platform 370 to transmit the output signal to the first remote platform 360.

The processing circuit 300 can determine a second estimated performance associated with the second remote platform 370 transmitting the output signal to the first remote platform 360 using the performance function 336 and state data regarding the second remote platform 370. The processing circuit 300 can evaluate the second estimated performance using the performance condition 344, such as to determine if the second remote platform 370 should be used to transmit the output signal to the first remote platform 360. This can enable the processing circuit 300 to make comparative decisions amongst options for providing the output information of the output signal to the first remote platform 360, depending on factors associated with the expected performance of the communication link that would be used to provide the output information to the first remote platform 360.

The second remote platform 370 may be of a plurality of second remote platforms 370, and the processing circuit 300 can determine a second estimated performance for each of the plurality of second remote platforms 370. For example, the processing circuit 300 can execute the machine learning model 340 to determine each second estimated performance. The processing circuit 300 can evaluate each second estimated performance using the performance condition 344 to determine whether to request one or more of the second remote platform(s) 370 to transmit the output signal to the first remote platform 360. In some embodiments, the processing circuit 330 provides the request to at least one second remote platform 370 for which the second estimated performance is better (e.g., higher than the estimated performance if the estimated performance is a signal strength; lower than the estimated performance if the estimated performance is an error rate) than the estimated performance. In some embodiments, the processing circuit 300 provides the request to at least one second remote platform 370 of the plurality of second remote platforms 370 based on the second estimated performance. The processing circuit 330 can assign a weight to each second estimated performance based on a confidence level of the second estimated performance indicated by the machine learning model 340.

The processing circuit 330 can evaluate the performance condition 344 based on assigning priorities to various communication links with and amongst the remote platforms 360, 370 (e.g., amongst the plurality of nodes 104). The processing circuit 300 can determine the priority assigned to each communication link based on the estimated performance that the processing circuit 330 determines for that link.

In some embodiments, the processing circuit 330 determines the priority based on at least one of the output information or an identifier of the nodes of the communication link for which the priority is being determined. This can enable the communication system 300 to ensure that high priority links are established first and maintained ahead of lower priority links, such as to ensure that high priority mission data is transmitted before low priority data.

Figure 4:
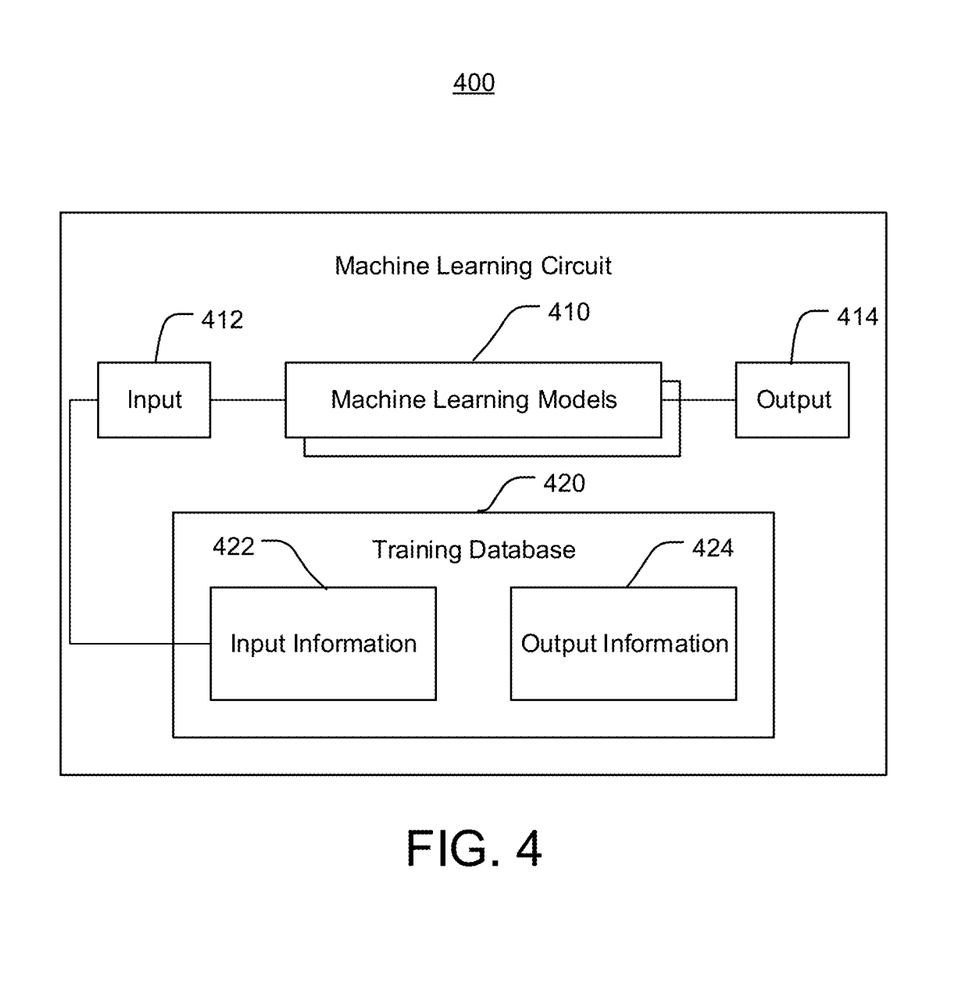
FIG. 4 is a block diagram of an exemplary embodiment of a machine learning circuit that can be used to train a machine learning model of the communication system of FIG. 3 according to the inventive concepts disclosed herein.

Referring now to FIG. 4, an embodiment of a machine learning circuit 400 according to the inventive concepts disclosed herein includes at least one machine learning model 410 and a training database 420. The machine learning model 410 can be trained to learn a functional relationship between trajectories of peer nodes and the resulting performance of communication links between the peer nodes, such as connectivity of the communication link as a function of at least one of relative position or relative orientation between the peer nodes. The machine learning model 410 can be trained using empirical or simulated data relating trajectories to performance in order to provide information such as expected performance of the communication links. For example, the machine learning model 410 can be trained to predict information corresponding to states (e.g., relative positions, relative orientations, portions of trajectories) at which connectivity may be expected to be guaranteed, states at which connectivity is spotty (e.g., the pilot may turn at different places using different arcs), or broken (e.g., the antennas of the peer nodes cannot be pointed at one another).

The machine learning model 410 can receive input information 422 from the training database 420 as input 412, and process the input 412 to generate output 414. The machine learning circuit 400 can execute supervised learning to train the machine learning model 410. The machine learning model 410 can include a candidate performance function, which the machine learning circuit 400 can execute to generate the output 414. For example, the machine learning circuit 400 can modify the machine learning model 410 based on the output 414, such as by comparing the output 414 to predetermined output information 424 of the training database 420, and modifying the machine learning model 410 based on the comparison. For example, the machine learning circuit 400 can evaluate an objective function (e.g., loss function) based on parameters of the machine learning model 410 (e.g., parameters that the machine learning model 410 uses to operate on the input 412 to generate the output 414) and a difference between the output 414 and the predetermined output information 424, and adjust the parameters of the machine learning model 410 to reduce the difference. As such, the machine learning model 410 can be trained based on historical performance data corresponding to historical maneuver data, which may be received from experimentation and/or simulation of a plurality of platforms.

The training database 420 can include input information 422 and output information 424. The input information 422 can include state data or movement data regarding trajectories between peer nodes, such as data that includes at least one of a relative position or a relative orientation of a first peer node relative to a second peer node. For example, the input information 422 can include information regarding relative positions and orientations between two peer nodes as well as between antennas of the two peer nodes. The input information 422 can include a plurality of state data points regarding at least one of the first peer node or the second peer node during the maneuver performed by the first peer node. The state data points can include the trajectory data.

In some embodiments, the machine learning circuit 400 receives the state data or movement data regarding each of the first peer node and the second peer node, such as platform state data (e.g., position, velocity, orientation, attitude, altitude, heading, etc.) regarding one or both of the peer nodes. The machine learning circuit 400 can generate the input information 422 by processing the received movement data to calculate at least one of a first relative position or a second relative orientation of the first peer node relative to the second peer node, and can processing the received movement data to calculate at least one of a second relative position or a second relative orientation of the second peer node relative to the first peer node. The machine learning circuit 422 can receive movement data regarding one or more antennas of each peer node, and process the movement data regarding the one or more antennas to generate relative position and/or orientation data regarding each antenna.

For example, the machine learning circuit 400 can receive movement data regarding movement of one or more peer nodes, such as a flying pattern. The flying pattern may be a loop flown by the peer node, such as a figure eight or other loop trajectory that a first node uses to distribute ISR data to other nodes within a region.

The output information 424 can represent the performance of the communication link given the states of the peer nodes at which the performance was measured. The output information 424 can include a plurality of performance data points regarding performance of the communication link during a maneuver performed by the first peer node. For example, the output information 424 can be received from a monitor of the peer node that measures the performance of the communication link. The output information 424 can correspond to the estimated performance described with reference to FIG. 3, such as a connectivity measured between the first peer node and the second peer node. The output information 424 can represent link quality. The output information 424 can represent states at which links were determined to be broken, or have link quality less than a threshold quality. The output information 424 can represent ground truth data used to train the machine learning model 410 to more accurately predict relationships between platform state data, such as relative positions and orientations, and resulting communication link quality.

The machine learning circuit 400 can identify output information 424 that corresponds to respective input information 422, such as to assign each performance data point of the output information 424 to a corresponding state data point of the input information 422. For example, the input information 422 and output information may each be associated with respective time stamps. The machine learning circuit 400 can use the time stamps to determine which input information 422 corresponds to which output information 424. For example, if the input information 422 includes a plurality of peer node states (e.g., positions and orientations) mapped to a plurality of time stamps, the machine learning circuit 400 can identify the output information 424 that corresponds to each peer node state.

The input information 422 can include an identifier of each antenna corresponding to each communication link for which the output information 424 is measured. For example, the identifier can indicate that the antenna is a steerable antenna or an omni-directional antenna. The identifier can correspond to the communication link, and can indicate a type of each antenna communicating over the communication link.

In some embodiments, the machine learning model 410 implements a regression model. The machine learning model 410 can be trained to generate the regression model to calculate an output response to the input information 422.

For example, the machine learning model 410 can implement a Gaussian process regression model. The Gaussian process regression model can be a function that generates an output representing communication link performance (e.g., connectivity) as a function of an input space (e.g., parameters analogous to the input information 422).

Figure 5:
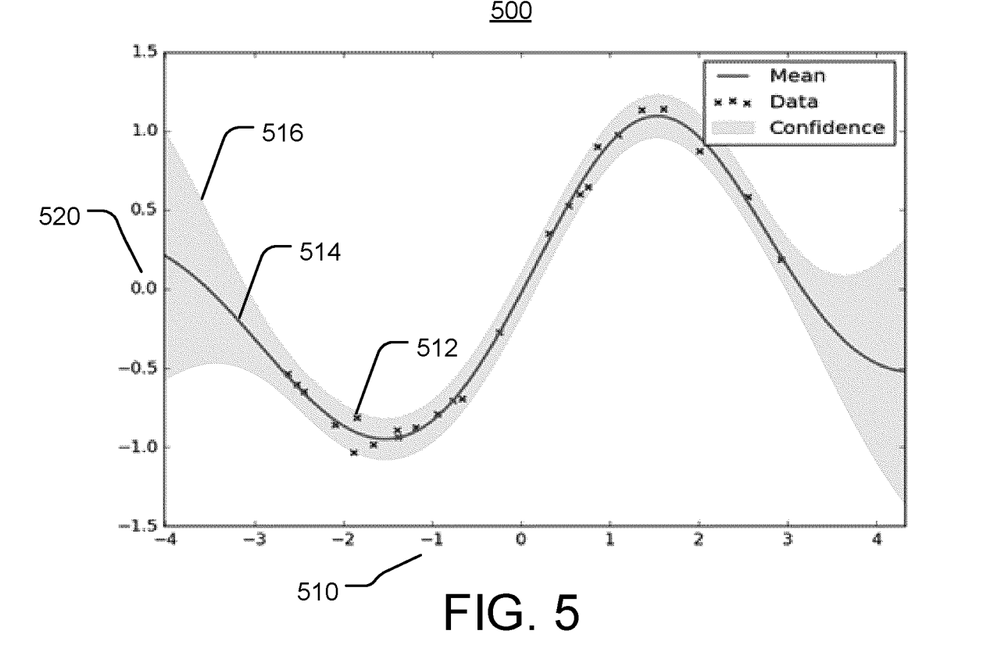
FIG. 5 is a chart representing an exemplary embodiment of operation of the machine learning model of FIG. 4.

The machine learning model 410 can generate a measure of uncertainty, such as a confidence, associated with each output value corresponding to a respective input state of the input space. For example, the Gaussian process regression model implemented by the machine learning model 410 can indicate a range of output values about the (predicted) output 414 corresponding to a predetermined confidence threshold (e.g., 95 percent confidence level). By providing the measure of uncertainty, the machine learning model 410 can indicate portions of the input space (e.g., trajectories, relative positions, relative orientations) for which there is relatively low or relatively high confidence regarding the predicted output 414 (e.g., the estimated performance described with respect to communication performance function 336 of FIG. 3), allowing the machine learning model 410 to provide a recommendation to request data regarding the portions of the input space for which there is relatively low or relatively high confidence. For example, Referring now to FIG. 5, an embodiment of a chart 500 corresponding to operation of the machine learning model 410 according to the inventive concepts disclosed herein illustrates a relationship between input information 510 on a first axis and output information 520 on a second axis. While FIG. 5 represents the input information 510 and output information 520 as each being of a single variable (e.g., single dimension), the input information 510 and output information 520 can each correspond to any number of variables, and can be similar to the input information 422 described with reference to FIG. 4. The input information 510 can be representative of navigation data, movement data, or state data regarding peer nodes, such as relative positions, relative orientations, or trajectories flown by the peer nodes. For example, the input information 510 can represent a difference between an orientation of a first antenna of a first peer node and an orientation at which the first antenna would be pointing directly at a second antenna of a second peer node. The output information 520 can represent a measured or predicted/expected performance of the communication link between the peer nodes of the input information 510, such as link connectivity.

As depicted in FIG. 5, the machine learning model 410 can use data points 512 to generate a regression model, such as a Gaussian process regression model, represented by a mean value curve 514 and corresponding confidence levels 516. The mean value curve 514 and confidence levels 516 can be an output of the regression, indicating an expected value of the output information 520 given particular input information 510.

The confidence levels 516 may vary as a function of input information 510. For example, the confidence levels 516 may increase (e.g., less confidence, greater uncertainty) for input information 520 at which relatively fewer data points 512 are available, and decrease for input information 520 at which relatively greater data points 512 are available.

Referring now to FIG. 6, an embodiment of a chart 600 corresponding to operation of the machine learning model 410 according to the inventive concepts disclosed herein illustrates a relationship between input information 610 on a first axis and output information 620 on a second axis. As depicted in FIG. 6, the machine learning model 410 uses a greater number of data points 612 to generate a regression model represented by a mean value curve 614 and corresponding confidence levels 616 as compared to the operations illustrated in FIG. 5. As such, the confidence levels 616 are relatively smaller for various values of input information 610, indicating greater confidence of the expected performance generated by the machine learning model 410.

Figure 7:
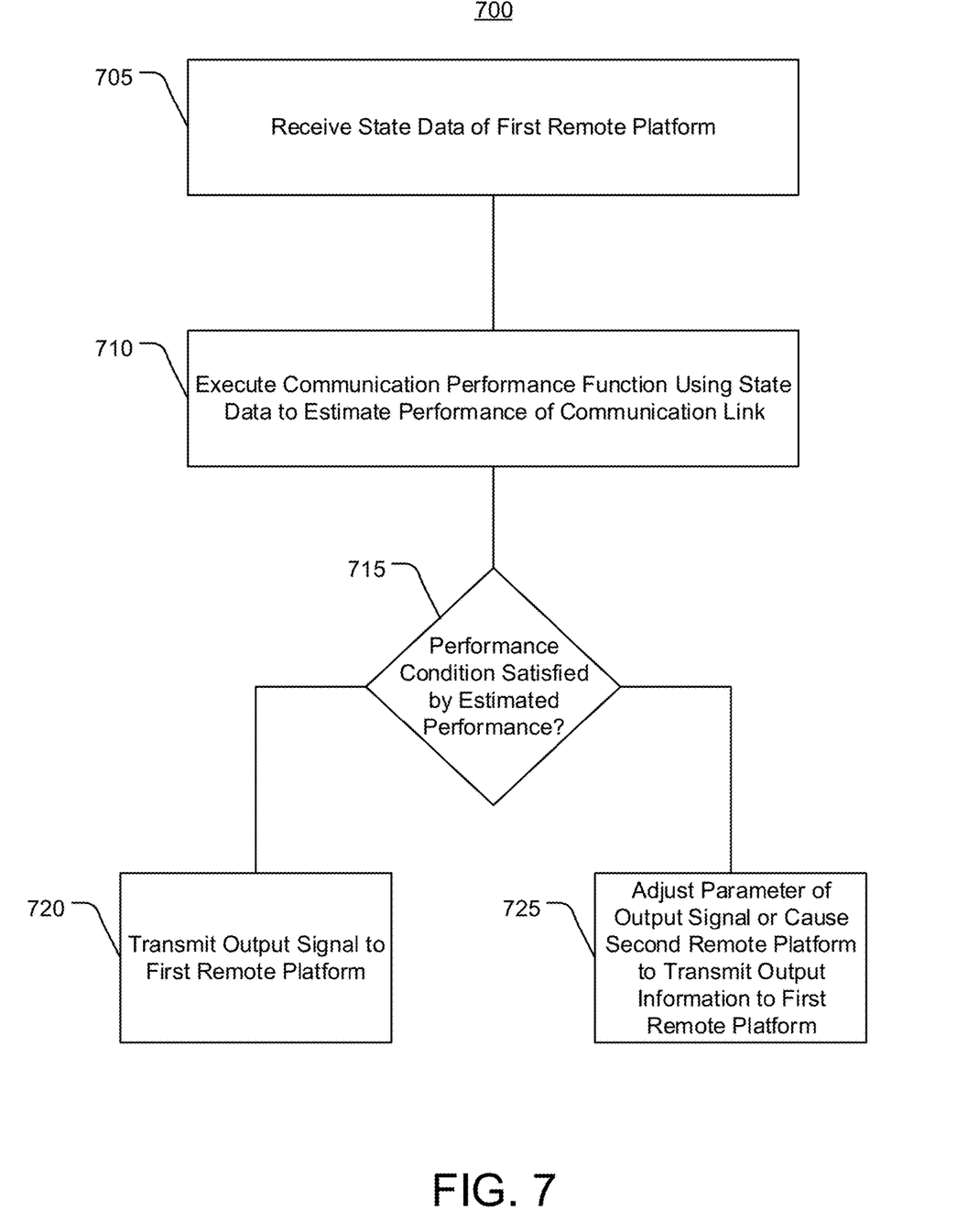
FIG. 7 is a flow diagram of an exemplary embodiment of a method of communication data link networking according to the inventive concepts disclosed herein.

Referring now to FIG. 7, an embodiment of a method 700 according to the inventive concepts disclosed herein includes one or more of the following steps. The method 700 can be performed using various systems and devices described herein, including the communication system 300.

A step (705) may include receiving state data regarding a first remote platform, such as a remote peer node. The first remote platform can be remote from a platform that implements the communication system 300 or components thereof. The state data can include navigation data, such as a position of an antenna of the first remote platform (e.g., azimuth, elevation), a position of the first remote platform (e.g., latitude, longitude, altitude), an attitude of the first remote platform (e.g., heading, pitch, roll), a velocity of the first remote platform (e.g., direction and speed; east, west, north, south, down, and up velocity), or a next waypoint of the first remote platform (e.g., latitude, longitude, altitude, time. The state data can be used to determine an expected or estimated position or orientation of the first remote platform or antennas thereof.

A step (710) may include executing a communication performance function using the state data to estimate a performance of a communication link that a transmit antenna uses to transmit an output signal to the first remote platform. The estimated performance can correspond to a likelihood that the communication link can be maintained during at least a portion of a maneuver performed by at least one of a platform that implements the communication system or the first remote platform. The estimated performance can correspond to an expectation of a link outage occurring during the maneuver. The estimated performance can be estimated based on an error rate of transmitting the output signal to the first remote platform, which can be an estimated error rate. The error rate can include various error metrics, such as bit error rate, frame error rate, or packet error rate. The performance function can be executed using a machine model trained based on historical performance data corresponding to historical maneuver data.

A step (715) may include evaluating a performance condition based on the estimated performance and a threshold performance. The threshold performance can indicate a threshold error (e.g., error rate) that should not be exceeded for transmission of the output signal. The estimated performance can be compared to the threshold performance to evaluate the performance condition. The performance condition can be evaluated based on a plurality of links between a plurality of transmit antennas and a plurality of receive antennas of the first remote platform.

In some embodiments, priorities are assigned to the communication links (e.g., with the first remote platform, with the second remote platform, between the first remote platform and the second remote platform). The priorities can be assigned based on the estimated performance, as well as information regarding the platforms or the communication links, such as the output information to be transmitted or identifiers of the remote platforms.

A step (720) may include transmitting the output signal to the first remote platform responsive to the performance condition being satisfied. For example, a direction of the transmit antenna can be controlled to transmit the output signal along the direction to the first remote platform.

A step (725) may include at least one of adjusting a parameter used to transmit the output signal or causing a second remote platform to transmit the output information to the first remote platform, responsive to the performance condition not being satisfied. For example, if the performance condition is not satisfied, a determination can be made that how the output information is transmitted should be adjusted (e.g., a time parameter or a frequency parameter can be changed) or that the second remote platform should be used to transmit the output information to the first remote platform. As such, the likelihood that the output information is received by the first remote platform can be increased. In some embodiments, the second remote platform is selected from a plurality of second remote platforms based on second estimated performances of each of the second remote platforms.

As will be appreciated from the above, systems and methods of CDL networking performance improvement using machine learning in accordance with the inventive concepts disclosed herein can improve the operation of network communications, such as between peer nodes, by reducing the likelihood that transmissions will be interrupted or lost due to being communicated over communication links that may have transient outages or other disconnectivities while maneuvers are being performed by one or more peer nodes of the links. For example, the present solution can enable a communication system to accurately predict if the communication link may be susceptible to errors when the output signal is transmitted, and determine to change how the output signal is transmitted or identify a different peer to transmit the output information of the output signal to the target peer node in order to reduce the likelihood of error.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A communication system, comprising:
a transmit antenna that transmits an output signal including output information;
a network interface that receives state data including orientation information associated with at least one of a first remote platform or a receive antenna of the first remote platform; and
a processing circuit configured to:
predict a performance of a communication link that the transmit antenna uses to transmit the output signal to a receive antenna of the first remote platform based on at least the orientation information associated with at least one of the first remote platform or the receive antenna of the first remote platform;
evaluate a performance condition based on the performance and a threshold performance;
responsive to the performance condition being satisfied, use the transmit antenna to transmit the output signal to the first remote platform; and
responsive to the performance condition not being satisfied, at least one of (i) adjust at least one of a time parameter or a frequency parameter that the transmit antenna uses to transmit the output signal to the receive antenna, or (ii) provide an instruction to a second remote platform to cause the second remote platform to transmit the output signal to the first remote platform.

2. The communication system of claim 1, wherein at least one sensor that detects platform state data regarding a platform that includes the communication system, the network interface outputs the platform state data.

3. The communication system of claim 1, wherein the processing circuit controls a direction of the transmit antenna to transmit the output signal along the direction to the first remote platform.

4. The communication system of claim 1, wherein:
the transmit antenna uses a first communication band to transmit the output signal; and
the network interface uses a second communication band different than the first communication band to receive the state data.

5. The communication system of claim 1, wherein the communication link is a common data link.

6. The communication system of claim 1, wherein the processing circuit estimates the performance based on an error rate of transmitting the output signal to the first remote platform, the error rate including at least one of a bit error rate, a frame error rate, or a packet error rate.

7. The communication system of claim 1, wherein the processing circuit assigns a first priority to the communication link with the first remote platform and a second priority to a second communication link with the second remote platform based on the performance, and evaluates the performance condition based on the first priority and the second priority.

8. The communication system of claim 1, comprising:
the performance is a first estimated performance; and
the processing circuit selects the second remote platform from a plurality of second remote platforms based on a second estimated performance of each of the plurality of second remote platforms.

9. The communication system of claim 1, comprising:
a communication performance function generated based on a machine learning model mapping historical platform navigation data to historical communication link performance.

10. The communication system of claim 1, wherein the processing circuit is configured to evaluate the performance condition based on a plurality of links between a plurality of transmit antennas and a plurality of receive antennas of the first remote platform.

11. A method, comprising:
receiving, at a network interface, state data including orientation information associated with at least one of a first remote platform or a receive antenna of the first remote platform;
executing, by a processing circuit, a communication performance function using at least one of the orientation information associated with at least one of the first remote platform or the receive antenna of the first remote platform to estimate a performance of a communication link that a transmit antenna uses to transmit an output signal to a receive antenna of the first remote platform;
evaluating, by the processing circuit, a performance condition based on the performance and a threshold performance;
responsive to the performance condition being satisfied, transmitting, using the transmit antenna, the output signal to the first remote platform; and
responsive to the performance condition not being satisfied, at least one of (i) adjusting, by the processing circuit, at least one of a time parameter or a frequency parameter that the transmit antenna uses to transmit the output signal to the receive antenna, or (ii) providing, by the processing circuit, an instruction to a second remote platform to cause the second remote platform to transmit the output signal to the first remote platform.

12. The method of claim 11, comprising:
controlling, by the processing circuit, a direction of the transmit antenna to transmit the output signal along the direction to the first remote platform.

13. The method of claim 11, comprising:
assigning, by the processing circuit, a first priority to the communication link with the first remote platform;
assigning, by the processing circuit, a second priority to a second communication link with the second remote platform; and
evaluating, by the processing circuit, the performance condition based on the first priority and the second priority.

14. The method of claim 10, comprising:
estimating, by the processing circuit, the performance based on an error rate of transmitting the output signal to the first remote platform.

15. The method of claim 10, wherein the performance is a first estimated performance, the method comprising:
selecting, by the processing circuit, the second remote platform from a plurality of second remote platforms based on a second estimated performance of each of the plurality of second remote platforms.

16. The method of claim 11, comprising:
evaluating the performance condition based on a plurality of links between a plurality of transmit antennas and a plurality of receive antennas of the first remote platform.

17. A method, comprising:
receiving, by a machine learning circuit, a plurality of performance data points regarding performance of a communication link between a first platform and a second platform during a maneuver performed by the first platform;

receiving, by the machine learning circuit, a plurality of state data points regarding at least one of the first platform or the second platform during the maneuver performed by the first platform, the plurality of state data points including orientation information associated with at least one of the first platform or a receive antenna associated with the second platform;

assigning, by the machine learning circuit, each performance data point of the plurality of performance data points to a corresponding state data point of the plurality of state data points;

providing, by the machine learning circuit, the plurality of state data points as an input to a candidate performance function, the candidate performance function including at least one parameter that operates on the input to generate a candidate output;

executing, by the machine learning circuit, the candidate performance function to generate the candidate output; and adjusting, by the machine learning circuit, the at least one parameter based on the plurality of performance data points and the candidate output to output an adjusted performance function.

18. The method of claim 17, comprising:

using, by the machine learning circuit, the adjusted performance function to assign a confidence score to a function output of the adjusted performance function.

19. The method of claim 17, comprising:

using, by the machine learning circuit, Gaussian process regression to generate the candidate performance function.

20. The method of claim 17, comprising:

adjusting, by the machine learning circuit, the candidate performance function using state data points and performance data points of a plurality of first remote platforms and a plurality of second remote platforms.

* * * * *